(12) United States Patent
Sorias

(10) Patent No.: US 11,214,131 B2
(45) Date of Patent: Jan. 4, 2022

(54) VEHICLE INTEGRATED RAIN GUARD

(71) Applicant: Business Class Tech Inc., Lawrence, NY (US)

(72) Inventor: Yeoshua Sorias, Brooklyn, NY (US)

(73) Assignee: BUSINESS CLASS TECH INC., Lawrence, NY (US)

( * ) Notice: Subject to any disclaimer, the term of this patent is extended or adjusted under 35 U.S.C. 154(b) by 90 days.

(21) Appl. No.: 16/745,755

(22) Filed: Jan. 17, 2020

(65) Prior Publication Data

US 2020/0231027 A1 Jul. 23, 2020

Related U.S. Application Data

(60) Provisional application No. 62/794,171, filed on Jan. 18, 2019.

(51) Int. Cl.
*B60J 3/02* (2006.01)
*B60J 3/00* (2006.01)

(52) U.S. Cl.
CPC ............. *B60J 3/0234* (2013.01); *B60J 3/005* (2013.01)

(58) Field of Classification Search
CPC ................................ B60J 3/0234; B60J 3/005
USPC ......................................................... 296/152
See application file for complete search history.

(56) References Cited

U.S. PATENT DOCUMENTS

| 1,845,577 | A | * | 2/1932 | Berliawsky | B60J 3/005 296/152 |
| 4,575,444 | A | * | 3/1986 | Paradis | B29C 55/00 264/167 |
| 4,923,241 | A | * | 5/1990 | Miller | B60J 1/20 296/154 |
| 4,945,624 | A | * | 8/1990 | Toti | B21D 5/08 29/453 |
| 5,192,111 | A | * | 3/1993 | Hanemaayer | B60P 3/343 135/88.1 |
| 6,782,904 | B2 | * | 8/2004 | Tien | B60J 11/00 135/88.01 |
| 8,662,563 | B1 | * | 3/2014 | Hardenbrook | E04H 15/08 296/154 |
| 2010/0078960 | A1 | * | 4/2010 | Raynor | B60J 5/0494 296/154 |

* cited by examiner

*Primary Examiner* — Joseph D. Pape
(74) *Attorney, Agent, or Firm* — Ostrolenk Faber LLP

(57) ABSTRACT

A retractable visor/rain guard system for a vehicle, for being selectively deployed to cover an upper region of a vehicle window of the vehicle. The visor system includes at least one extendable and retractable panel that is movable into or out of a channel formed in a roof section of the vehicle. It also includes a moving mechanism that engages the at least one panel and drives the at least one panel in and out from the channel in a direction and with such orientation, that the at least one panel moves initially horizontally and then at least partially over a window frame of a door of the vehicle when the door is in a closed position such that the at least one panel extends on an outside of and spaced away from the upper region of the vehicle window, to provide protection from inclement weather elements.

15 Claims, 15 Drawing Sheets

VEHICLE INTEGRATED RAIN GUARD

CROSS-REFERENCE TO RELATED APPLICATION

The present non-provisional patent application claims the benefit of and priority to U.S. Provisional Patent Application No. 62/794,171, filed Jan. 18, 2019, by Yeoshua Sorias, and entitled "VEHICLE INTEGRATED RAIN GUARD," the entire content of which is incorporated herein by reference.

BACKGROUND OF THE INVENTION

The present invention is generally directed to automobile visor and, more particularly, to a rain and snow visor that serves as a temporary owning over a driver's or a passenger's window and extends partially over and slightly away from the window to keep out or block rain or snow from entering the vehicle when the window is slightly open.

In prior art inventions, the window rain guards are typically portable and generically shaped plastic guards that need to be installed into the upper window channel above the car's door. The idea is to protect the inside of the car from rain when the window is slightly opened by the user/drive.

User experience is a serious problem. All current solutions in the market are not easy at all to install and aesthetically displeasing to look at.

SUMMARY OF THE INVENTION

In the present invention, the rain guard is built-in the car roof channel above the window. It is invisible during normal use. User experience is also hugely improved. Controlling the rain guard is as easy and intuitive as pressing an electronic button inside the car. When users press the button the rain guard automatically slides out of its storage, forms a nicely curve shape mimicking the industrial design and natural shape of the car, while protecting the inside of the car from any incoming droplets of rain and snow when the user slightly opens the car windows.

In preferred embodiments, the invention can be realized as a retractable visor system for a vehicle, for being selectively deployed to cover an upper region of a vehicle window, the visor system comprising: at least one extendable and retractable panel that is movable into or out of a channel formed in a roof section of the vehicle; and a moving mechanism that engages the at least one panel and drives the at least one panel in and out from the channel in a direction and with such orientation, that the at least one panel moves initially horizontally and then at least partially over a window frame of a door of the vehicle when the door is in a closed position, such that the at least one panel extends on an outside of and spaced away from the upper region of the vehicle window, to provide protection from inclement weather elements.

The retractable visor system may include a shaft driven by one of a spring loaded device and a motor for driving the at least one panel over the shaft in and out of the channel formed in the roof section of the vehicle. The at least one extendable and retractable panel can be made of a clear material to provide improved visibility.

The moving mechanism may comprise a telescoping push/pull system. A flexible rubber strip to seal an opening into the channel formed in the roof section may be included and the at least one extendable and retractable panel may be made of flexible material reinforced by ribs.

In an embodiment, the at least one extendable and retractable panel is comprised of a plurality of panels that are arranged alongside one another and physically interconnected to one another and the plurality of panels are not oriented in a common plane, wherein the plurality of panels include at least some panels that have a curved body shape and wherein each of the panels comprises on an interior surface thereof gear engaging grooves and including respective gears, wherein each gear engages a respective one of the gear engaging grooves for translating each of the panels in and out of the channel, and further including tabs affixed to the panels and said tabs being located to ride inside stationary brackets that are immovable relative to the channel, to stabilize movement of the panels, and further including a motor for providing rotation power to gears associated with a first one of said plurality of panels and including a plurality of flexible couplings for transmitting the rotational power to gears associated with other ones of said plurality of panels.

In an embodiment, also included is an electrical controller for regulating the operation of said moving mechanism, which preferably includes an operator interface for providing operational instructions to said retractable visor system, a sensor embedded in a seat of the vehicle and coupled to said electrical controller for providing an indication to said controller when no person is sitting on said seat and generating responsive thereto an instruction to the electrical system to control the mechanism to retract the at least one panel, a proximity sensor located in a position to sense the hand of a human reaching for a door handle associated with said vehicle window and generating, responsive thereto, a signal that causes the moving mechanism to retract said at least one panel. The proximity sensor is configured to produce an alarm signal, and including an alarm circuit connected to said alarm signal and operative for creating an alarm to the person which may be anyone of an audio or visual alarm to alert the operator to slow down the opening of the vehicle door.

In an embodiment, the invention comprises a system for preventing the door associated with said vehicle window from being opened or closed while said at least one panel is deployed in an extended position.

Other features and advantages of the present invention will become apparent from the following description of the invention which refers to the accompanying drawings.

DETAILED DESCRIPTION OF PREFERRED EMBODIMENTS OF THE INVENTION

Figure 1:
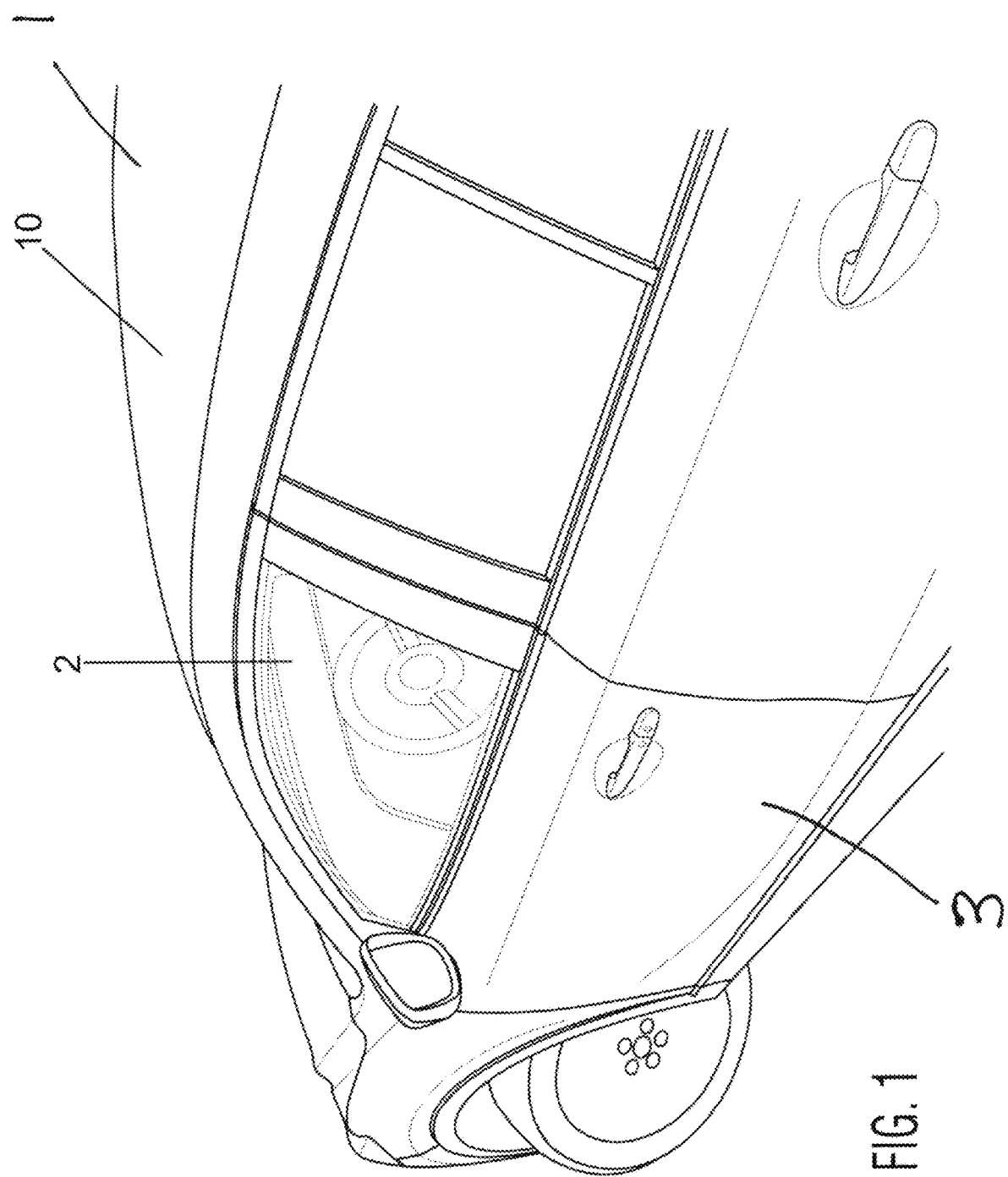
FIG. 1 shows the prior art car without any visor.

In prior art FIG. 1, the vehicle 10 has a roof 1, a door 3 and a window 2 in the door.

Figure 2:
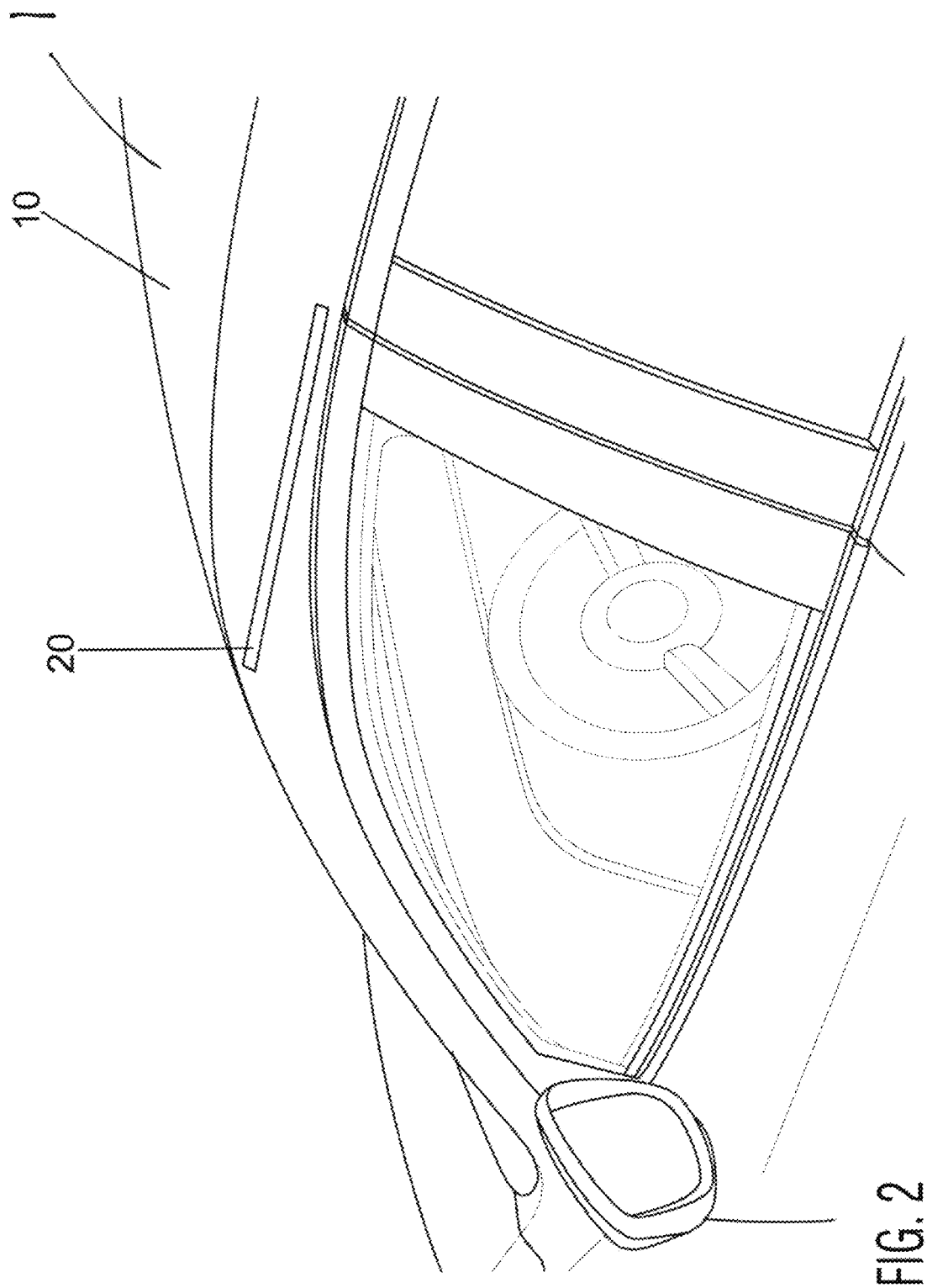
FIG. 2 shows the roof has been thickened to accommodate the visor system. The visor port is closed and the visor is retracted.
Figure 3:
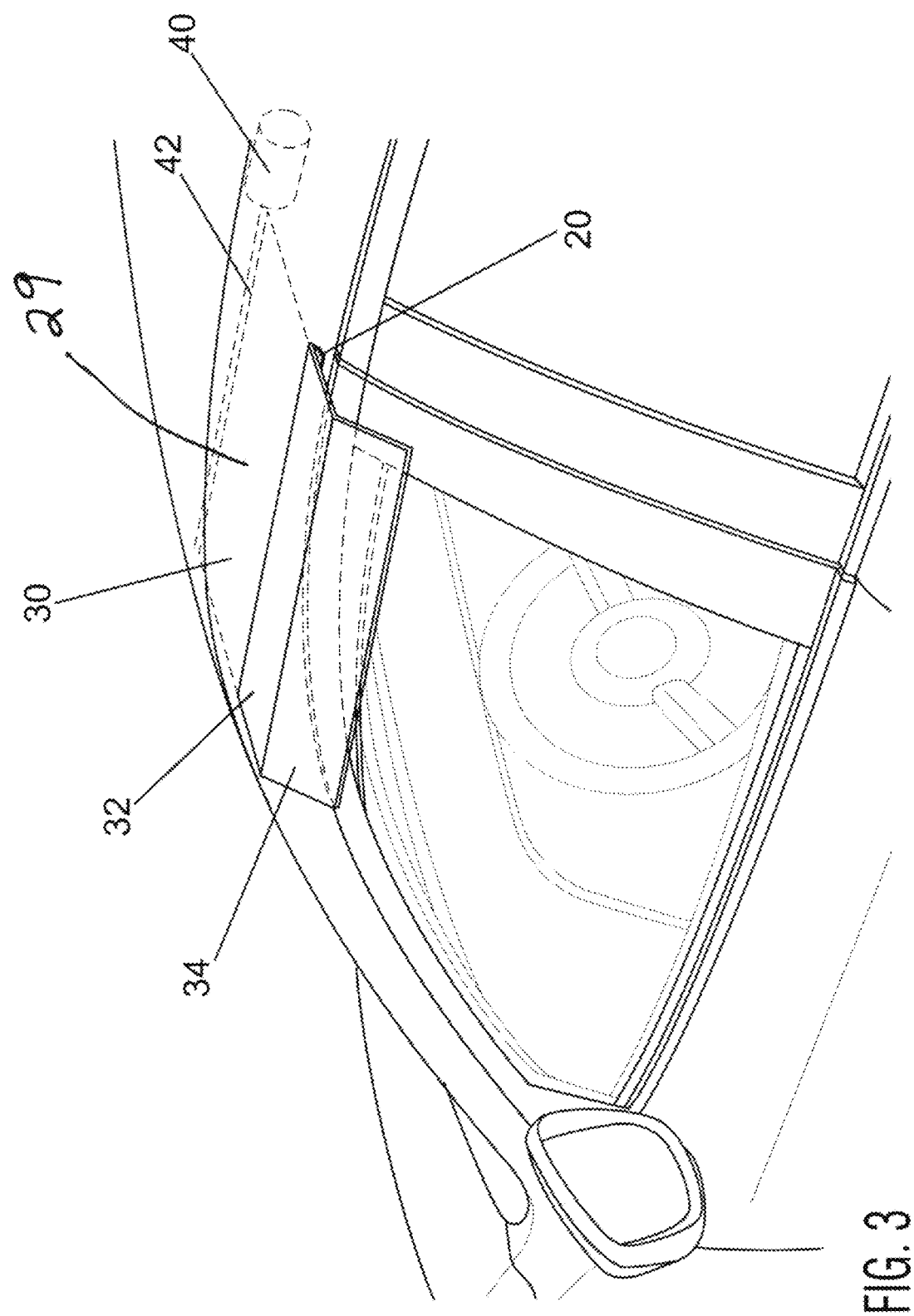
FIG. 3 shows the visor extended.

FIG. 2 shows the opening 20 into the internal channel 29, formed in the roof of the car 10. FIG. 3 shows the shade/visor 30 that has a horizontal section 32 and a downward section 34, the latter covering the open gap in the slightly opened window, protecting against the elements. The shade 30 is driven over a shaft 42 by a spring loaded device or alternatively by motor 40. The deployment system in this embodiment is like a window shade. The visor port is open and visible on end. A hinge has a bend point to fold down for protection. Optionally, the visor can be stiff and use two rollers (one attached to a motor), one tight underneath as a guide. These roll the visor shade back and forth between rollers. In this embodiment, the motor and roller would be closer to the door.

Figure 4:
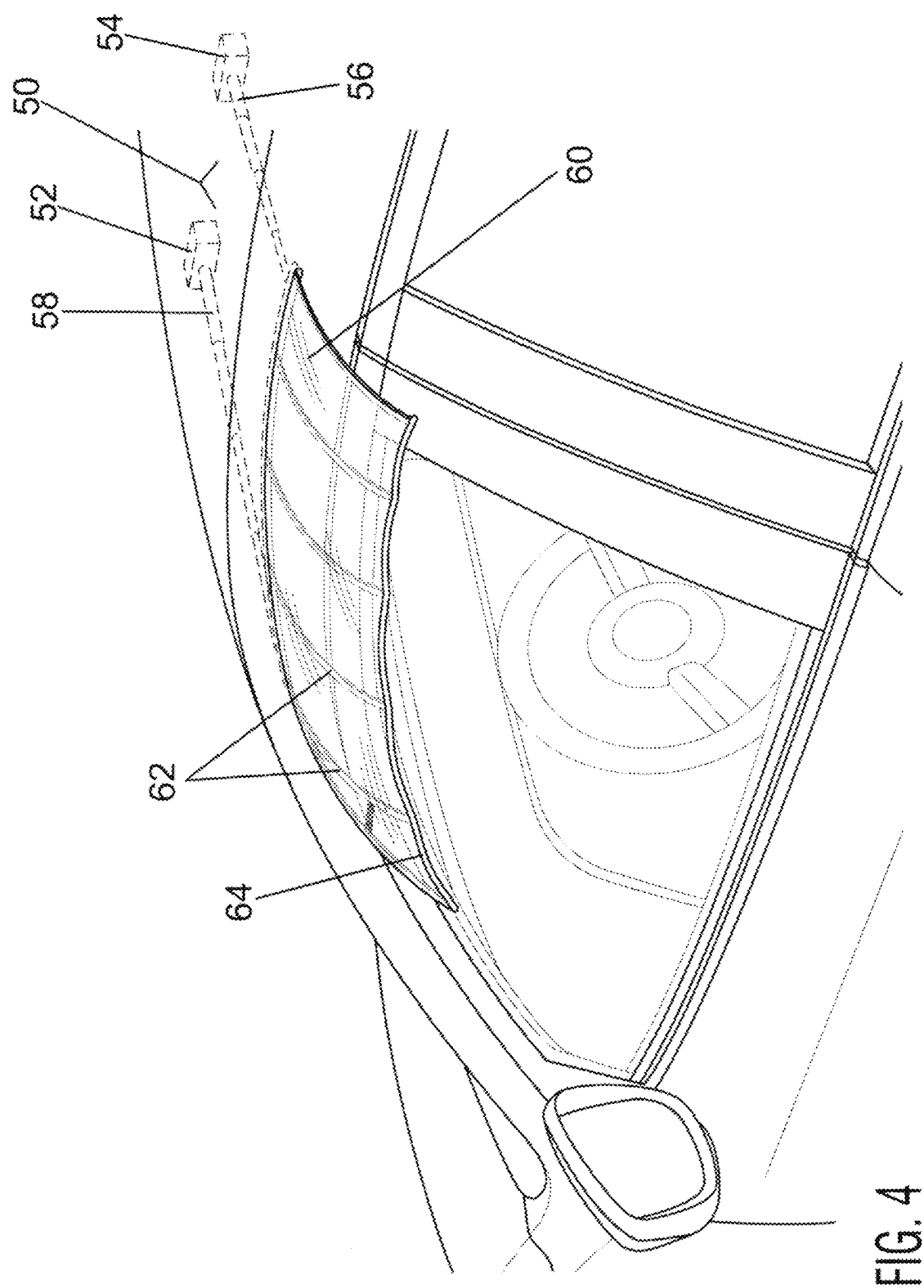
FIG. 4 shows extended metal bands with pretensioned arcs that straighten when retracted.
Figure 5:
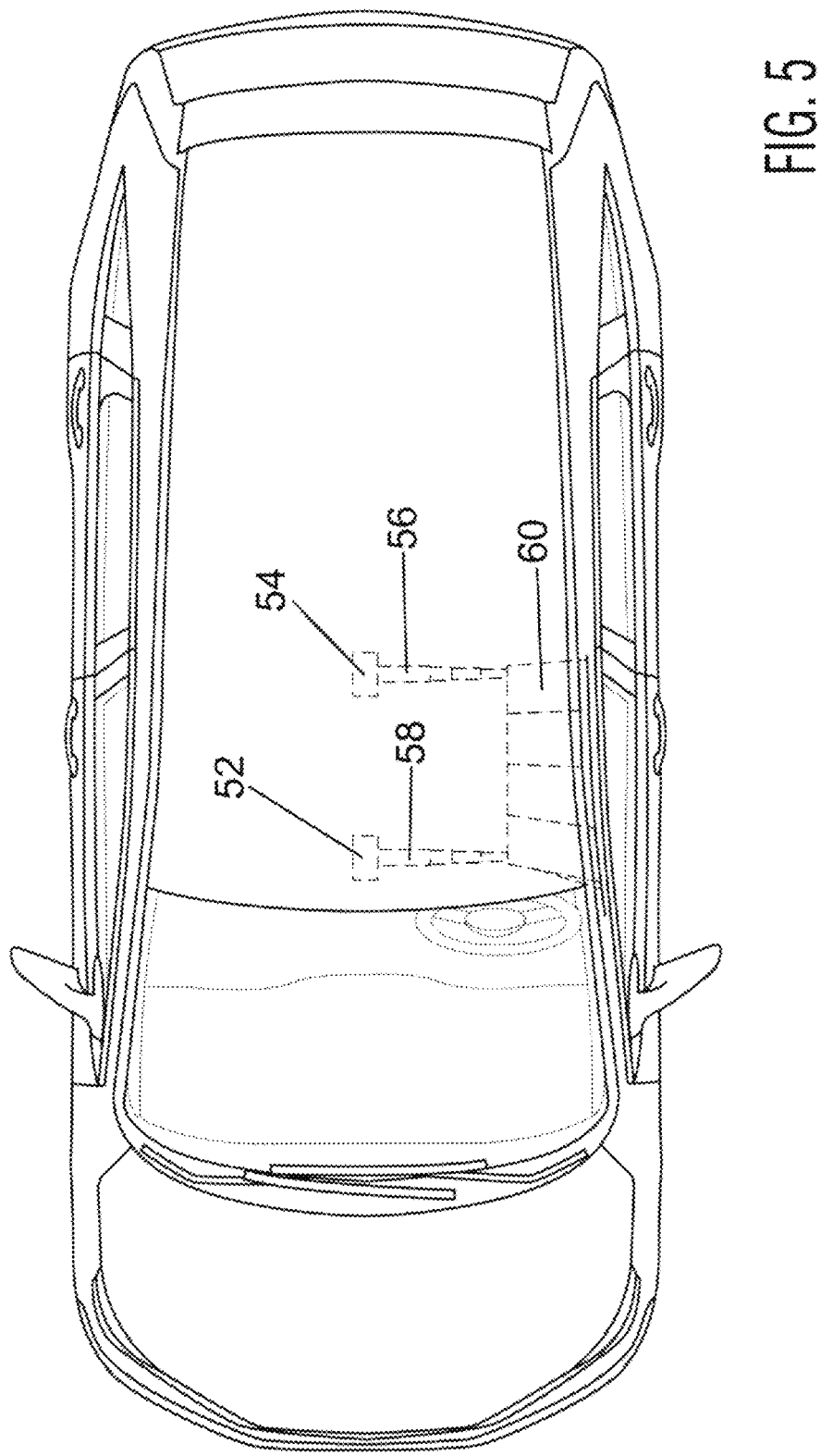
FIG. 5 is a top view of a second visor system embodiment, which is retracted. It shows a spring loaded arm on left, compressed.
Figure 6:
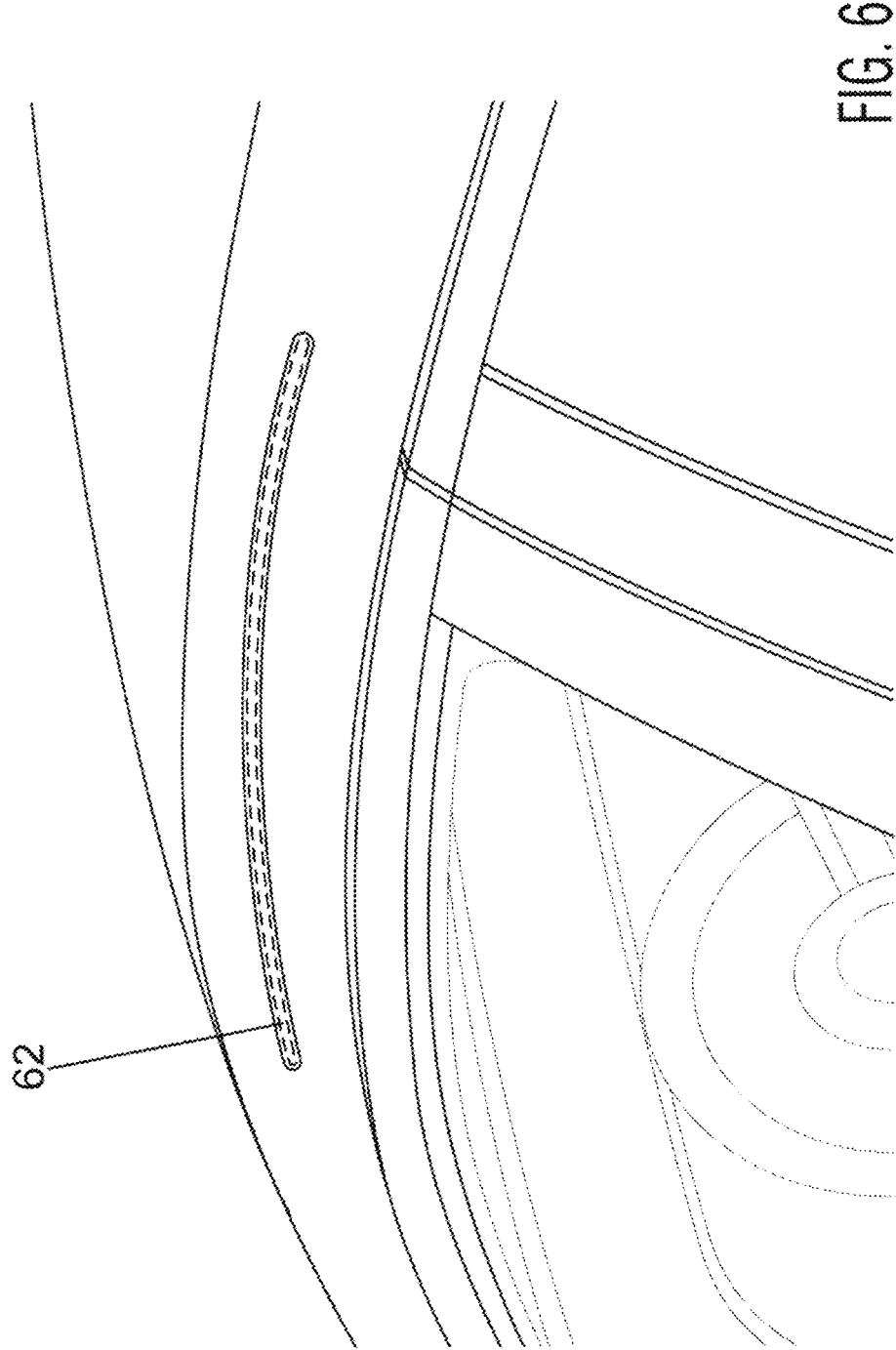
FIG. 6 shows the second visor embodiment retracted, and shows a rubber seal over the slot in car.

In FIG. 4, clear material can be used for better visibility/allow light in. A telescoping push/pull system is used to actuate the shade/visor. The far left metal arm is spring loaded to expand outward when the visor is extended to increase coverage to a lower part of window. One end has a flexible rubber strip to seal the opening in car when retracted.

In the second embodiment, the visor 60 is made of a flexible material reinforced by ribs 62 that terminate an end bar 64, assuming naturally a bend-over configuration or shape over the window 2. The shade 60 can be deployed and retracted by telescoped bars 56/58 that are pulled/pushed by actuators 54/52, respectively.

Figure 7:
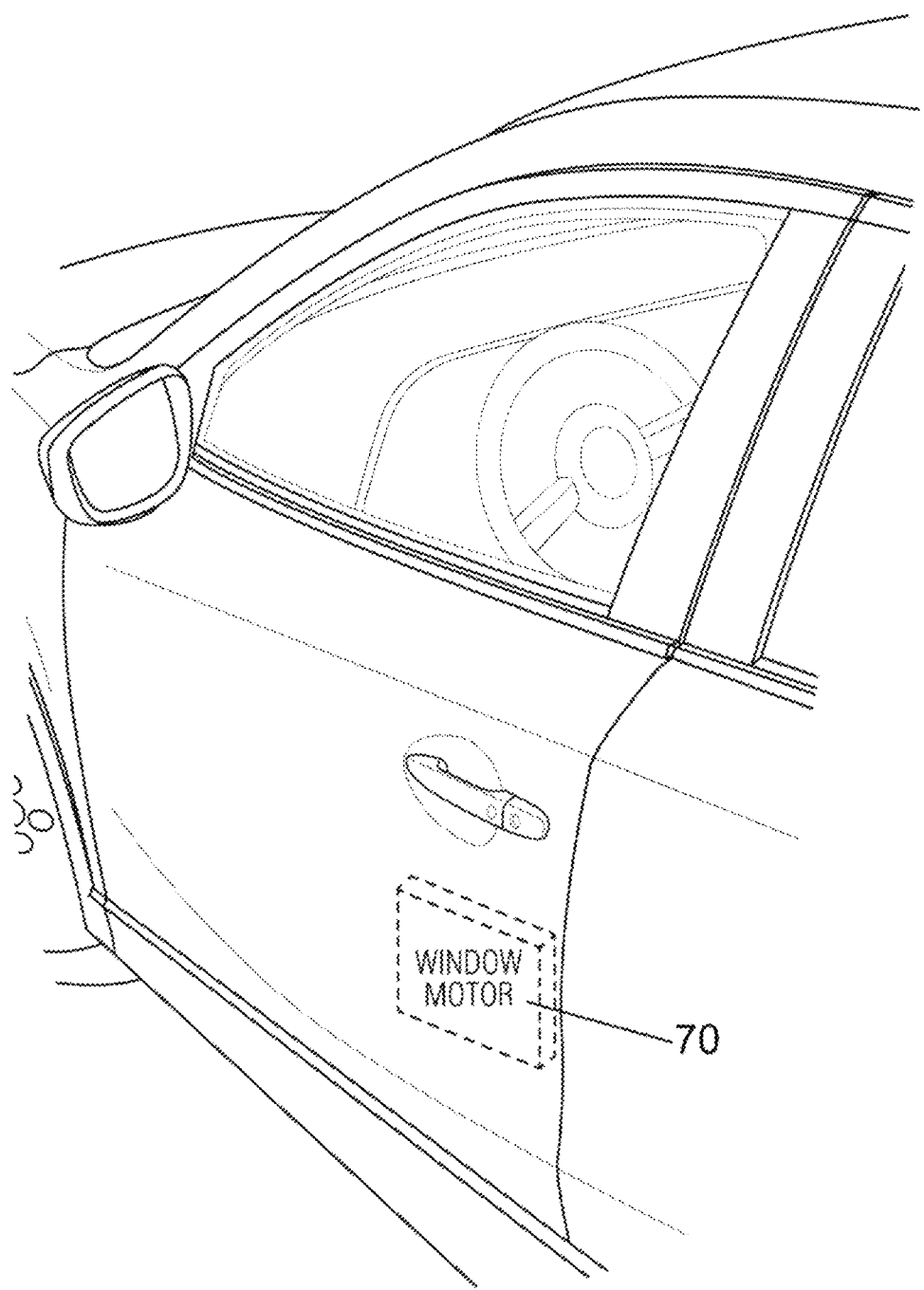
FIG. 7 shows a prior art car with the window motor indicated.
Figure 8:
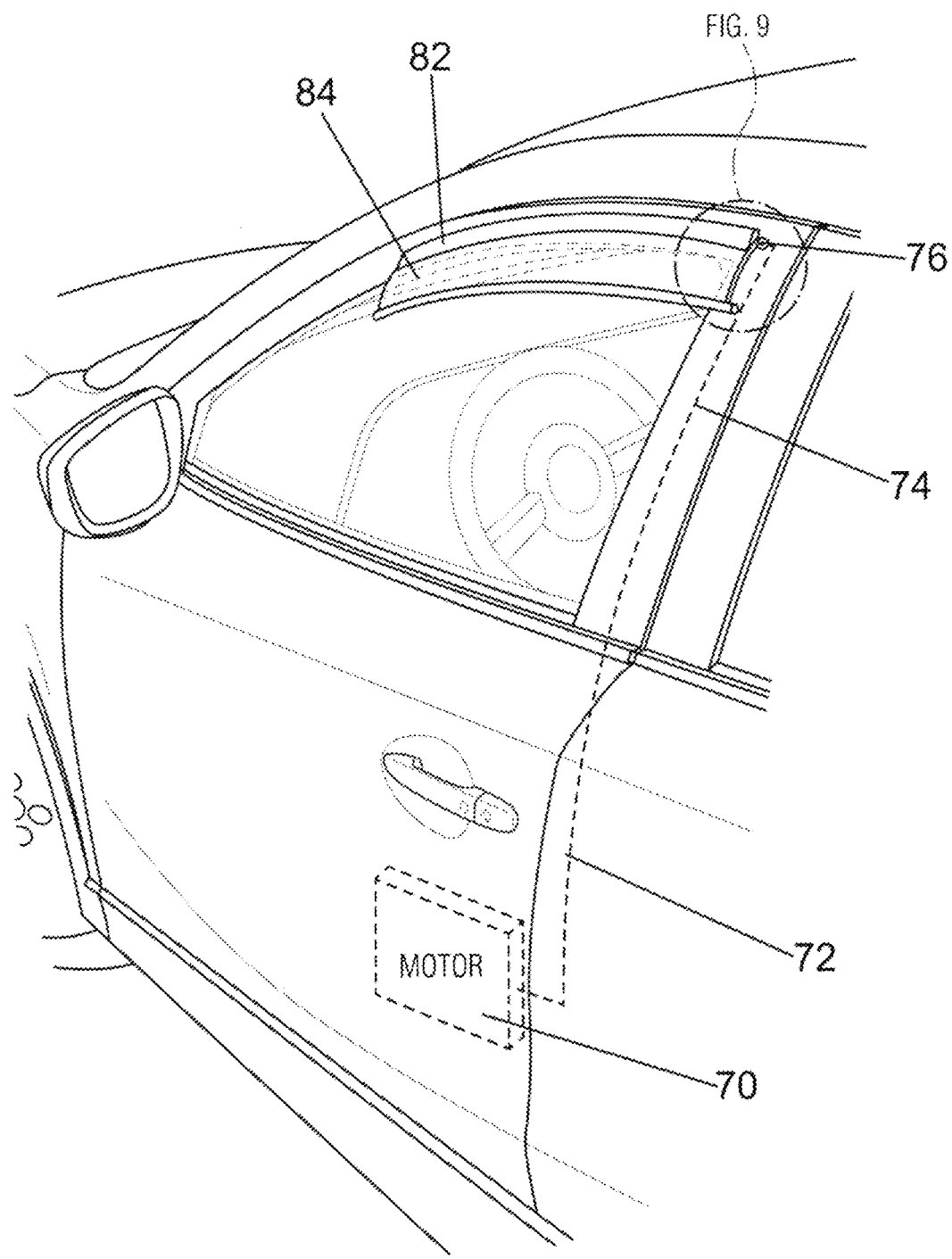
FIG. 8 shows a third visor embodiment, extended in a thickened doorframe/post, which is actuated using a window mounted motor.

In the third embodiment, the window motor 70 shown in FIG. 7 is coupled via mechanical or electrical line 72 (shown in FIG. 8) to drive the shade controller 76, to move the shade 84 onto or off the roller 82.

Figure 9:
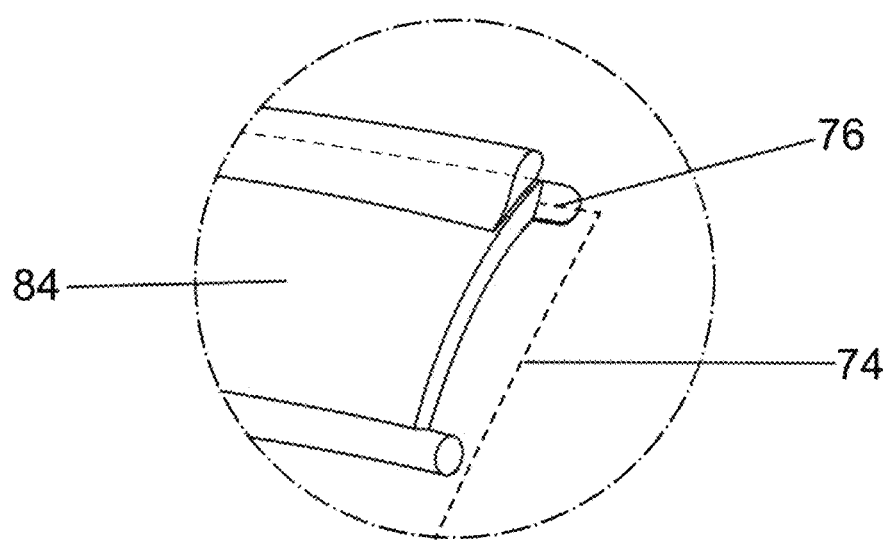
FIG. 9 shows a third embodiment with an enlarged section, showing a slot in a car door pillar.

In FIG. 9, protective rubber seal on top of visor is provided to avoid water entering while in use. A bottom edge of visor has a rubber seal to close the opening in door when the visor is retracted.

Figure 10:
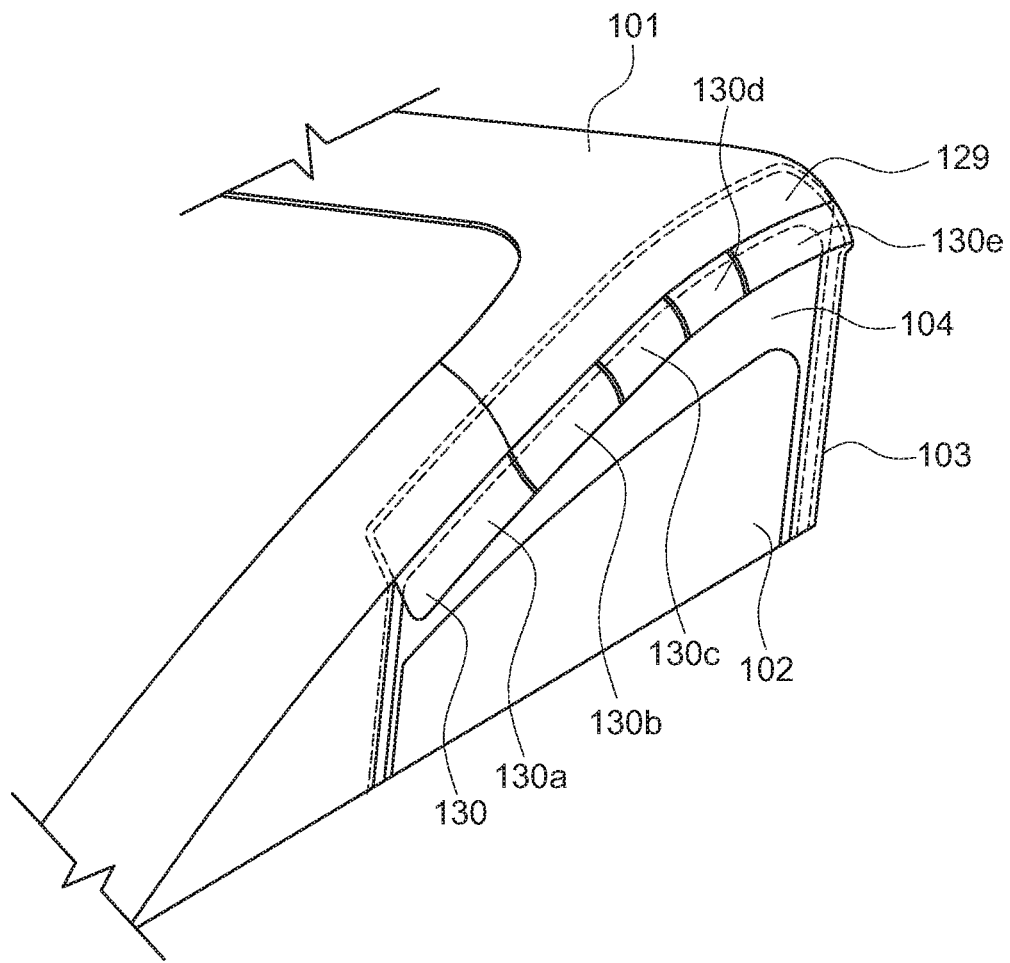
FIG. 10 diagrammatically illustrates another visor/rain guard system in accordance with the present invention.

With reference to FIG. 10, a vehicle which may be an automobile, a truck or any type of vehicle has a roof 101 with a thickened portion thereof, in which is defined a channel 129 for a multi-panel visor/rain guard 130 that can include several sections, for example, panel sections 130a, 130b, 130c, 130d and 130e.

In a typical automobile, a door 103 has a window 102 which can be driven up and down, leaving a gap 104 in the window frame through which rain can penetrate to discomfort the driver of the vehicle.

Along the lines described above, the visor/rain guard system 130 can be driven outside the interior channel 129 substantially covering the opening 104 at some distance from the window, which provides the needed protection against rain, sunshine and the like. Normally, in the absence of rain, the operator controls the system to retract the visor system 130 into the roof 101 of the vehicle so it is nested and concealed in the channel 129.

Figure 11:
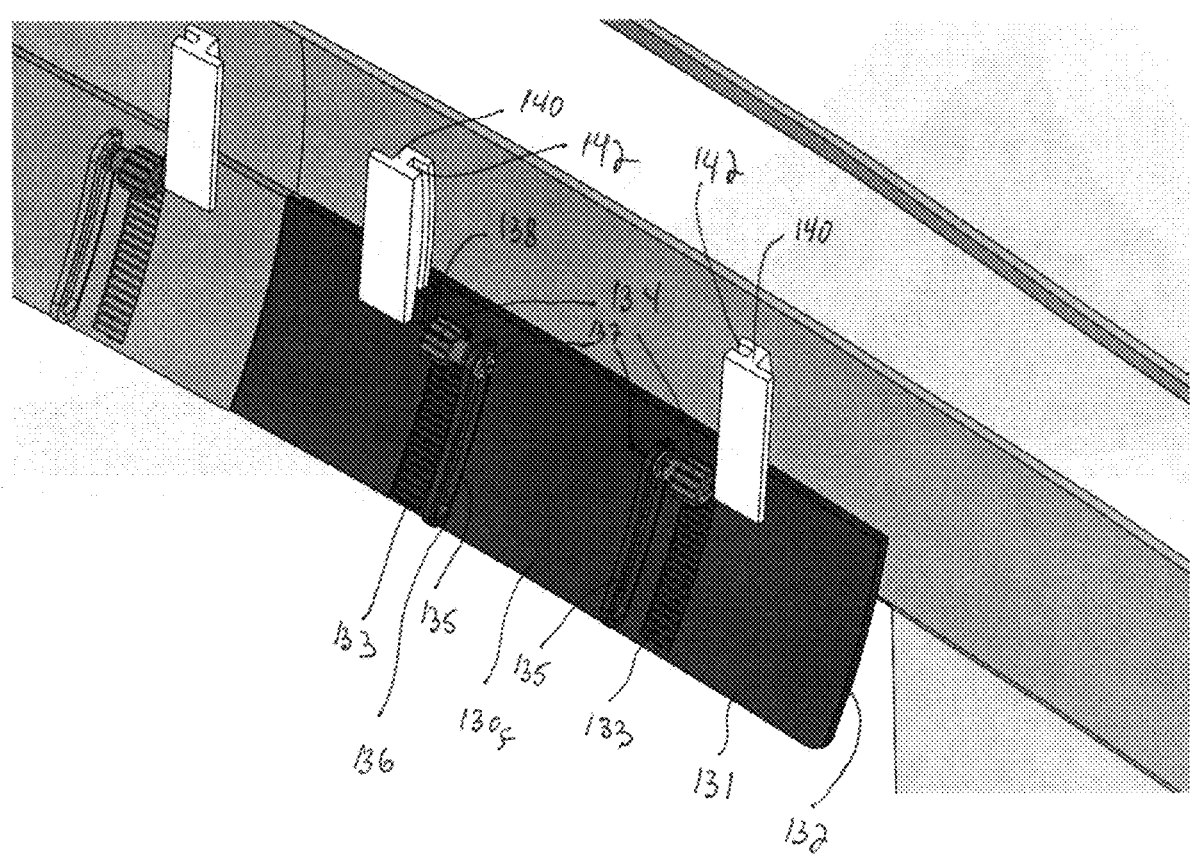
FIG. 11 shows mechanical details of the visor/rain guard system of FIG. 10.

With reference to FIG. 11, an exemplary panel 130f is shown, viewed from its interior surface 131. Generally, the panel has a curved body shown by 32 so that when it is retracted outside the channel 129, it will tend to come down and cover the gap 104. A typical extension over the window can be several inches, for example, from three to seven inches.

Mechanically, the interior surface of each exemplary panel 13f has gear engaging grooves 133 at two spaced locations on the interior surface, as shown. To retract or extend each panel, a pair of gears 134 are mounted to firmly engage the grooves 133 when the gear is rotated, with a shaft 137 of the gear riding in a frame 135 that has an interior and arcuate shaped channel 136 allowing the panel 13f to rise up and down in the figure and thereby in and out of the opening into the interior channel 129.

To ensure stable movement of the panel 130f, the panel has a pair of tabs 138 that ride in fixed brackets 140, more specifically in panel guiding channels 142 that face each other and which receive the tabs 138 to allow the panels to move up and down relative to the fixedly located tabs 140. The source of the motive power for rotating the gears is described further on.

Figure 12:
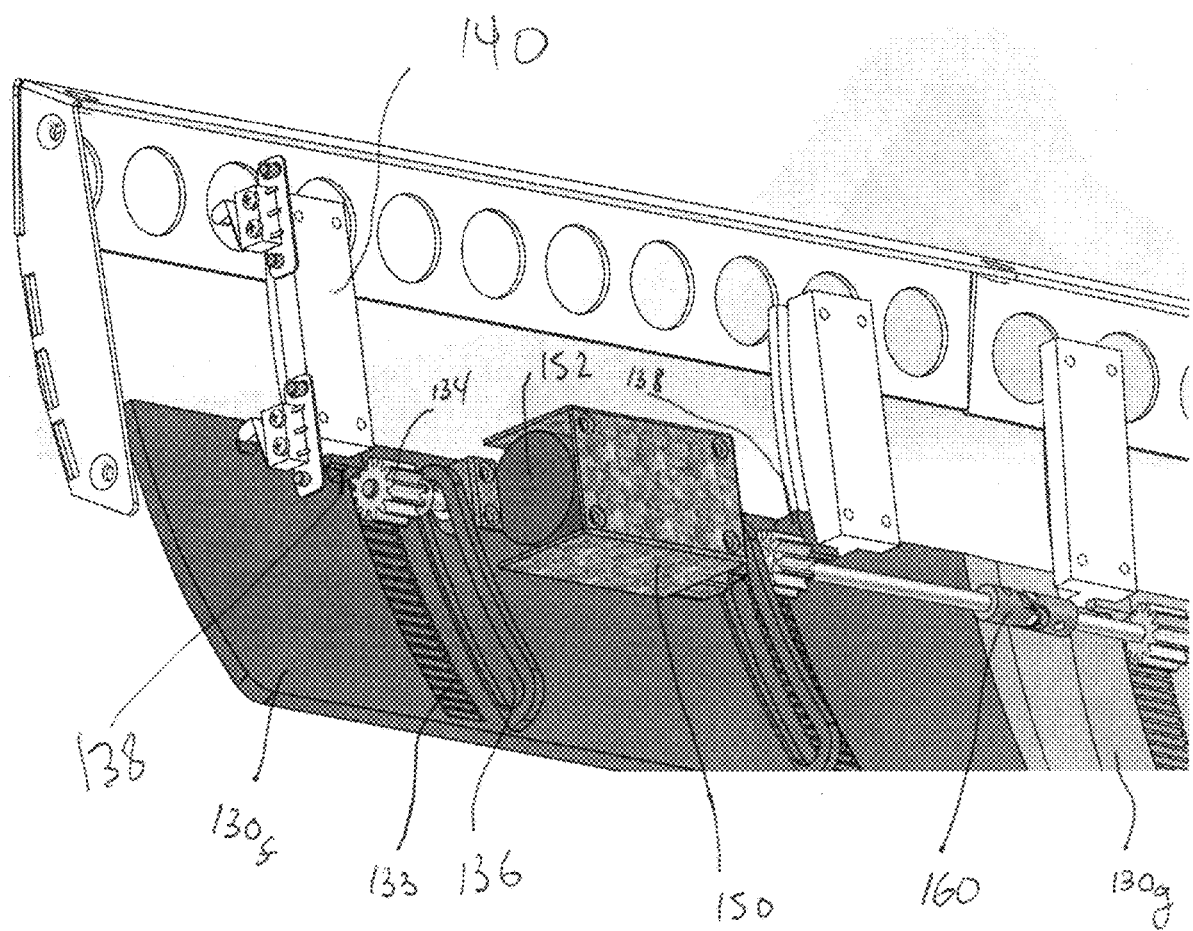
FIG. 12 shows a motor control for the visor/rain guard system of FIG. 10.

Referring to FIG. 12, the exemplary panel 130f having the gear grooves 133 that are engaged by the gears 134 require rotational power which is provided from the motor assembly 150 that includes a motor 152 which is connected through the gears 134 as shown in FIG. 12. The motor assembly 150 receives electrical control signals (described later on) that allow the gears to turn in one direction or another to raise/retract or extend the panel 130f.

Since several panels are provided, which are arranged one following the other and not necessarily in the same planes, to allow accommodating the curved surfaces and structures in a vehicle to which the panels are matched, the rotational power to operate their individual gears of each panel is provided from the main motor assembly 150 through several flexible/universal coupling 160. Thereby, when the motor is operated, the gears of all the other panels are rotated as well, despite their being located on different planes or orientations. Thereby, the gears associated with an adjacent panel, for example, the panel 130g will be rotated simultaneously and all the panels in the visor/rain guard system will retract and extend with each other in unison.

Figure 13:
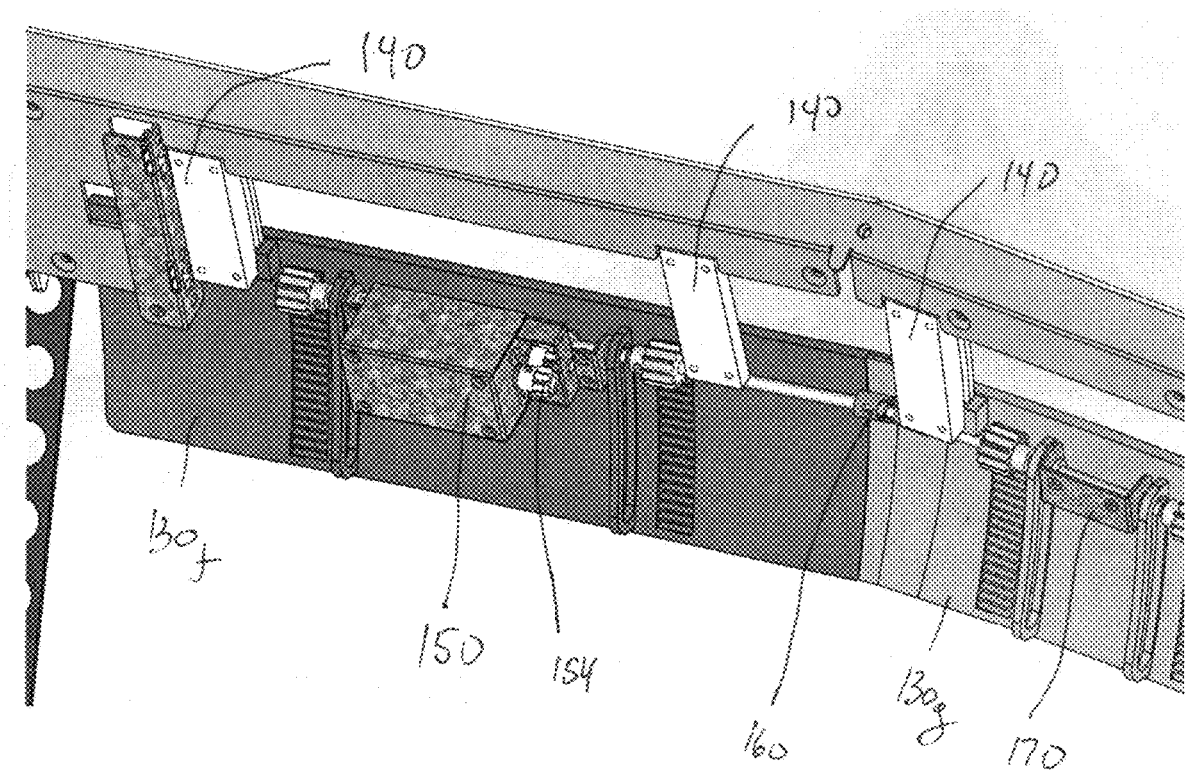
FIG. 13 shows mounting details of the visor/rain guard system of FIG. 10.

The foregoing can be appreciated from FIG. 13 which shows the visor panel 130f being at some angle and not necessarily in a flat plane with each other. Still, the universal coupler 160 is able to couple the rotational power from the motor system 150 from one panel to the next and so on to all the adjacently and sequentially located panels to achieve an overall panel assembly as diametrically illustrated in FIG. 14. Since motors typically rotate at high speeds, the physical gears need to rotate at lower speeds is provided in the form of the motor gear box 154 illustrated in FIG. 13.

Figure 14:
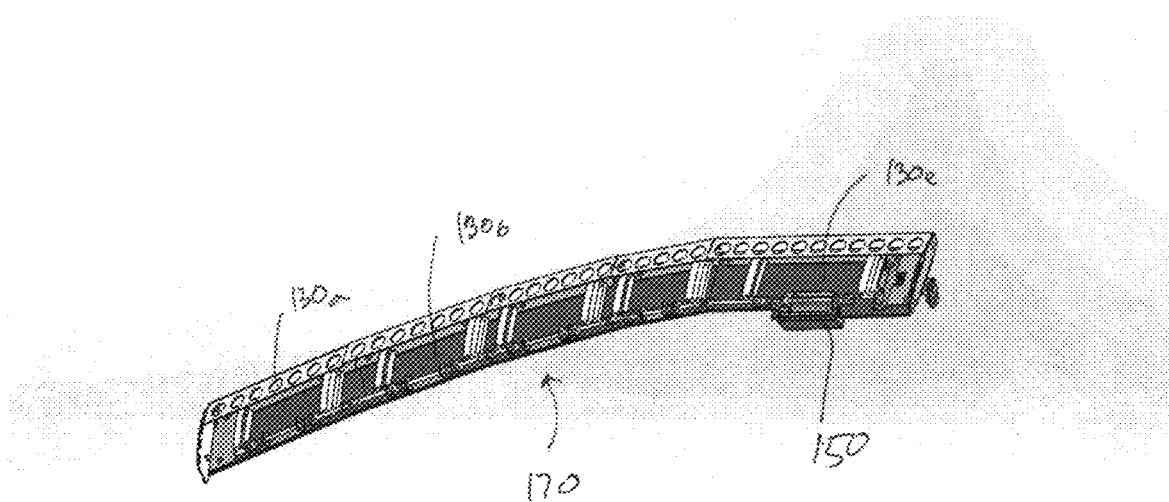
FIG. 14 diagrammatically illustrates the assembled visor/rain guard system of FIG. 10 in a retracted position.

Thus, FIG. 14 illustrates a fully assembled visor/rain guard panel system 170 which is arranged along a curved path and all of the panels are mechanically and rotationally coupled to the motor system 150 for being driven in and out of the roof of the vehicle as previously described. It should be clearly understood that the aforementioned figures describe the driving mechanisms for the panel which is located on the invisible side of the panels, which is the rear side of the panel. In contrast, in FIG. 10 is seen the outside of the panel, i.e., its flat decorative side.

Figure 15:
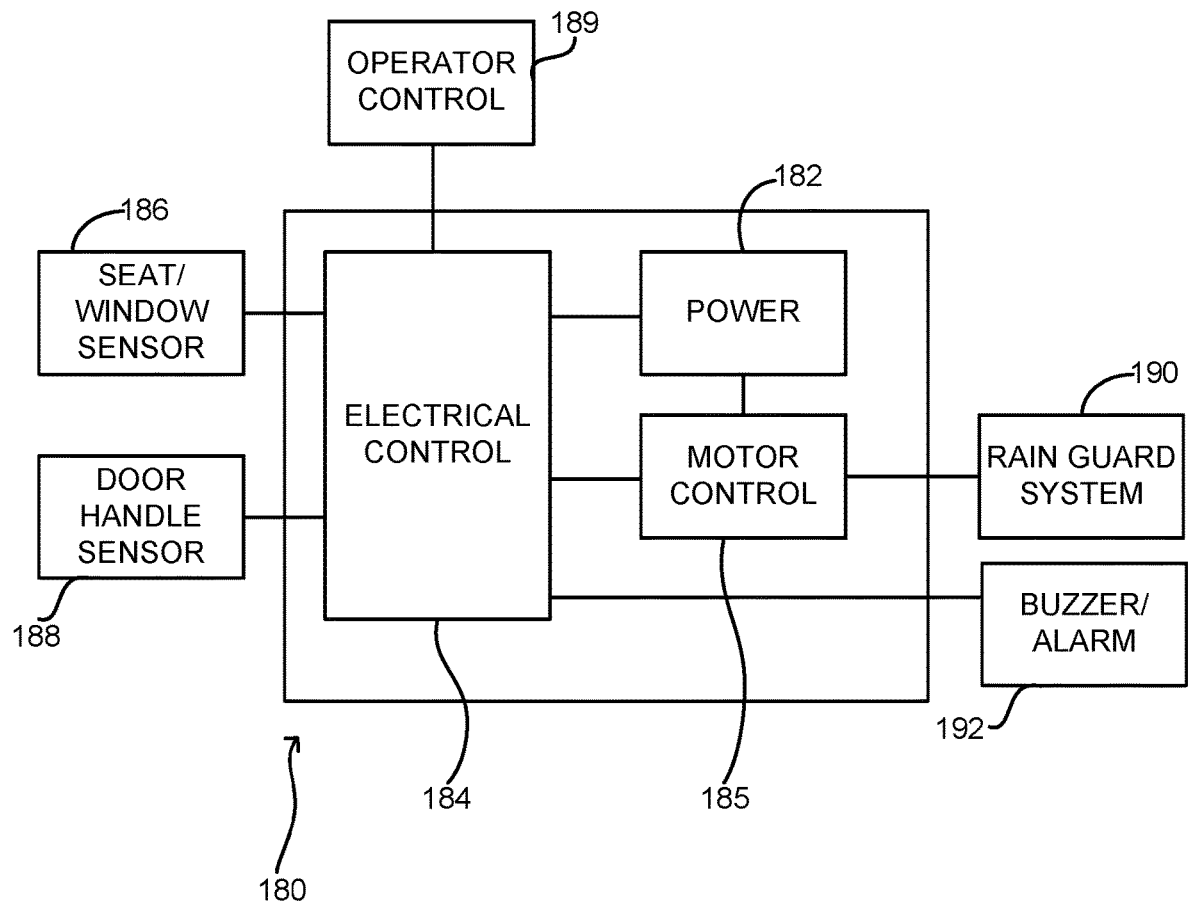
FIG. 15 shows an electrical control system for the visor/rain guard system's various embodiments of the present invention.

A visor/rain guard system as previously described requires electrical controls and power for the motor system 150. FIG. 15 shows an exemplary embodiment of a control system for the visor system of the present invention in the form of an overall electrical control system 180 which is coupled to the vehicle's electrical system to provide a power source 182 for the internal electrical control 184 and to a motor control 185. The electrical control 184 is in turn responsive to sensors and to operator actuated manual controllers including a seat or window sensor 186, a door handle sensor 188 and an operator control 189, whose functions may be described as follows.

Typically, it is imperative to assure that when the door 103 of the vehicle is opened and closed, the visor/rain guard system is its retracted position. In accordance with embodiments of the present invention, the electrical control is operative to issue the appropriate motor control signals from the motor control 185 to the rain guard system 190 that will always assure that when nobody is located in seat adjacent to the window space being regulated, and then the visor system is in the retracted position. In another embodiment, any time that the window is detected to be fully closed, the visor is automatically retracted. However, the operator control 189 may provide the driver with overriding buttons that allow the sun visor to extend even when the window is fully closed, for example, to provide shade over the driver side window when the main sun visor of the vehicle (not shown) is deployed in a forward blocking direction.

To assure that the driver does not accidentally open the door when the rain guard system is deployed, the door handle sensor contains a proximity sensor near the door handle so that as soon as the hand of the driver, or any object approaches the door handle, the control instantly (in a matter of a second or less) causes the rain guard panels to be retracted, to avoid the door being opened and then crashing into and possibly breaking the extended panels of the rain guard system 190. In an embodiment, to alert the driver and to provide additional protection, as soon as the hand or an object comes near the door handle on the inside of the vehicle, a buzzer or an alarm 192 sounds or a light flashes to allow the driver to stop opening the door and allow the rain guard to be fully retracted.

It will be apparent to one of ordinary skill in the art that the mounting of the panels can be arranged so that the opening into the channel and roof of the car is wide enough and the panels are mounted with hinges so that if the car door is opened while the panels are extended, they will be simply pushed up and then slightly bent owing to their flexible bodies, so that no damage will result to the individual panels.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A retractable visor system for a vehicle, for being selectively deployed to cover an upper region of a vehicle window, the visor system comprising:
    at least one extendable and retractable panel that is movable into or out of a channel formed in a roof section of the vehicle; and
    a moving mechanism that engages the at least one panel and drives the at least one panel in and out from the channel in a direction and with such orientation, that the at least one panel moves initially horizontally and then at least partially over a window frame of a door of the vehicle when the door is in a closed position, such that the at least one panel extends on an outside of and spaced away from the upper region of the vehicle window, to provide protection from inclement weather elements,
    wherein the at least one extendable and retractable panel is comprised of a plurality of panels that are arranged alongside one another and physically interconnected to one another and the plurality of panels are not oriented in a common plane, and
    wherein the plurality of panels include at least some panels that have a curved body shape.

2. The retractable visor system of claim 1, including a shaft driven by one of a spring loaded device and a motor for driving the at least one panel over the shaft in and out of the channel formed in the roof section of the vehicle.

3. The retractable visor system of claim 1, wherein the at least one extendable and retractable panel is made of a clear material to provide improved visibility.

4. The retractable visor system of claim 1, wherein the moving mechanism comprises a telescoping push/pull system.

5. The retractable visor system of claim 1, further including a flexible rubber strip to seal an opening into the channel formed in the roof section.

6. The retractable visor system of claim 1, wherein the at least one extendable and retractable panel is made of flexible material reinforced by ribs.

7. The retractable visor system of claim 1, wherein each of the panels comprises on an interior surface thereof gear engaging grooves and including respective gears, wherein each gear engages a respective one of the gear engaging grooves for translating each of the panels in and out of the channel.

8. The retractable visor system of claim 7, further including tabs affixed to the panels and said tabs being located to ride inside stationary brackets that are immovable relative to the channel, to stabilize movement of the panels.

9. The retractable visor system of claim 7, further including a motor for providing rotation power to gears associated with a first one of said plurality of panels and including a plurality of flexible couplings for transmitting the rotational power to gears associated with other ones of said plurality of panels.

10. The retractable visor system of claim 1, including an electrical controller for regulating the operation of said moving mechanism.

11. The retractable visor system of claim 10, further including an operator interface for providing operational instructions to said retractable visor system.

12. A retractable visor system for a vehicle, for being selectively deployed to cover an upper region of a vehicle window, the visor system comprising:
    at least one extendable and retractable panel that is movable into or out of a channel formed in a roof section of the vehicle; and
    a moving mechanism that engages the at least one panel and drives the at least one panel in and out from the channel in a direction and with such orientation, that the at least one panel moves initially horizontally and then at least partially over a window frame of a door of the vehicle when the door is in a closed position, such that the at least one panel extends on an outside of and spaced away from the upper region of the vehicle window, to provide protection from inclement weather elements; and including a system for preventing the door associated with said vehicle window from being opened or closed while said at least one panel is deployed in an extended position.

13. A retractable visor system for a vehicle, for being selectively deployed to cover an upper region of a vehicle window, the visor system comprising:

at least one extendable and retractable panel that is movable into or out of a channel formed in a roof section of the vehicle; and a moving mechanism that engages the at least one panel and drives the at least one panel in and out from the channel in a direction and with such orientation, that the at least one panel moves initially horizontally and then at least partially over a window frame of a door of the vehicle when the door is in a closed position, such that the at least one panel extends on an outside of and spaced away from the upper region of the vehicle window, to provide protection from inclement weather elements, an electrical controller for regulating the operation of said moving mechanism; and further including a proximity sensor located in a position to sense the hand of a human reaching for a door handle associated with said vehicle window and generating, responsive thereto, a signal that causes the moving mechanism to retract said at least one panel.

14. The retractable visor system of claim 13, wherein said proximity sensor is configured an alarm signal, and including an alarm circuit connected to said alarm signal and operative for creating an alarm to the person which may be anyone of an audio or visual alarm to alert the operator to slow down the opening of the vehicle door.

15. The retractable visor system of claim 12, including a sensor embedded in a seat of the vehicle and coupled to said electrical controller for providing an indication to said controller when no person is sitting on said seat and generating responsive thereto an instruction to the electrical system to control the mechanism to retract the at least one panel.

* * * * *